United States Patent [19]
Victorin

[11] Patent Number: 5,548,820
[45] Date of Patent: Aug. 20, 1996

[54] ANTENNA AND FEEDER CABLE TESTER

[75] Inventor: John A. Victorin, Stockholm, Sweden

[73] Assignee: Telefonaktiebolaget LM Ericsson, Stockholm, Sweden

[21] Appl. No.: 280,654

[22] Filed: Jul. 26, 1994

[51] Int. Cl.6 .................................................. H04B 17/00
[52] U.S. Cl. ...................... 455/67.4; 455/115; 455/129; 343/703
[58] Field of Search .................................. 455/67.1, 67.4, 455/115, 117, 129; 343/703; 379/1, 26, 29; 324/637, 645, 646

[56] References Cited

U.S. PATENT DOCUMENTS

| | | |
|---|---|---|
| 3,795,910 | 3/1974 | Robinson, Jr. . |
| 4,249,258 | 2/1981 | Craven .................................... 455/115 |
| 4,262,246 | 4/1981 | Fujii ....................................... 455/115 |
| 4,274,156 | 6/1981 | Trefney . |
| 4,584,650 | 4/1986 | Kozuch . |
| 4,703,259 | 10/1987 | Berliner et al. . |
| 4,799,063 | 1/1989 | Hill . |
| 4,823,280 | 4/1989 | Mailandt et al. . |
| 4,932,075 | 6/1990 | Dimitrijevic et al. . |
| 5,157,338 | 10/1992 | Motherbaugh et al. . |

FOREIGN PATENT DOCUMENTS

| | | |
|---|---|---|
| 57-28441 (A) | 2/1982 | Japan . |
| 0210040 | 10/1985 | Japan ..................... 455/115 |
| 405110524 | 4/1993 | Japan ..................... 455/115 |
| 405136747 | 6/1993 | Japan ..................... 455/115 |
| 1385102 | 3/1988 | U.S.S.R. . |
| 1453339 | 1/1989 | U.S.S.R. . |
| 2272604 | 5/1994 | United Kingdom . |
| WO/9427385 | 11/1994 | WIPO . |

OTHER PUBLICATIONS

89–213123/29, English abstract of SU 1453339 above.
88–284522/40, English abstract of SU 1385102 above.
"Directional Power Meter NAUS", Burkhart, *News from Rohde & Schwartz*, vol. 13, 1973, pp. 13–15.

*Primary Examiner*—Andrew Faile
*Attorney, Agent, or Firm*—Burns, Doane, Swecker & Mathis, L.L.P.

[57] ABSTRACT

In a communications system including a base station coupled to a transmission antenna by means of a transmission feeder cable, and coupled to a receiving antenna by means of a receiving feeder cable, a method and system for testing the antennas and feeder cables includes a testing apparatus located at or near the antenna end of the feeder cables. A processor located within the testing apparatus initiates tests in response to commands received from the base station by means of a digital interface, which preferably uses one or both feeder cables as a communications medium. The testing apparatus includes directional couplers for each of the feeder cables, and corresponding power detectors for measuring both forward (incident) and reverse (reflected) power. A test tone generator places a known signal on the receiving feeder cable to enable the receiving antenna VSWR to be measured, as well as to transmit the test tone down to the base station for use in measurement of receiving feeder cable attenuation. On the transmission side, incident power of a known signal supplied by the base station to the transmission feeder cable may be measured by the transmission power detector at the top of the transmission feeder cable. Measuring the amount of power reflected back by the transmission antenna then enables determination of the transmission antenna VSWR. All test results may be sent back to the base station, by means of the digital interface, for further analysis and status reporting.

35 Claims, 3 Drawing Sheets

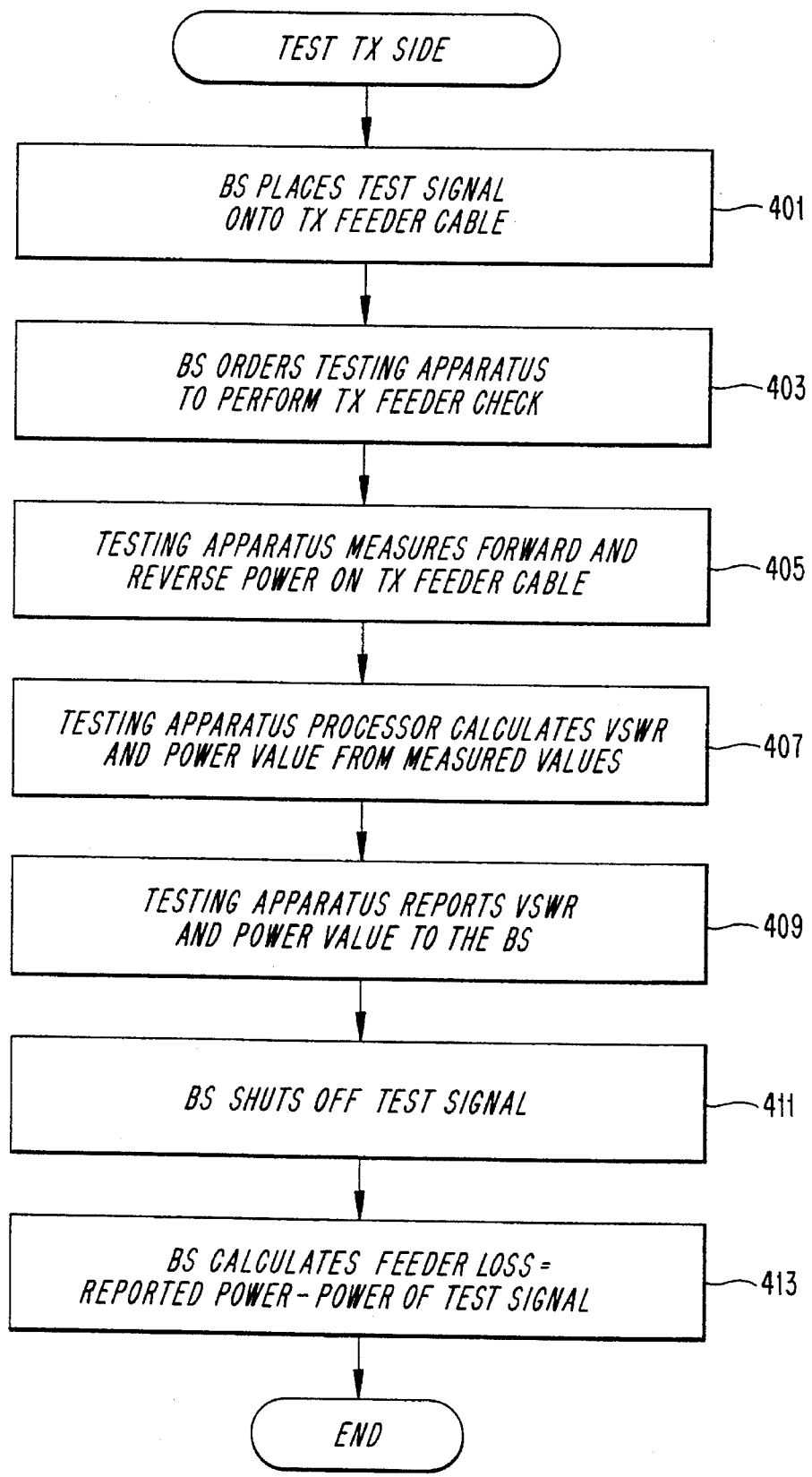

ANTENNA AND FEEDER CABLE TESTER

BACKGROUND

The present invention relates to an antenna and feeder cable tester, and more particularly to the testing of antennas and feeder cables associated with a base station in a mobile telephone communication system.

Mobile communications systems, such as cellular telephone systems, typically rely on the use of radio for communicating with mobile subscribers. As illustrated in FIG. 1, such systems have a fixed site, such as a cellular telephone system base station (BS) 101, coupled to a transmitting (TX) antenna 105 by means of a TX feeder cable 103. The BS 101 is further coupled to a receiving (RX) antenna 109 by means of an RX feeder cable 107. When the system is operational, radio frequency signals are transmitted from the TX antenna 105 to a mobile subscriber 111. Signals transmitted by the mobile subscriber 111 are received by the RX antenna 109 and supplied to the BS 101 by means of the RX feeder cable 107.

Because proper functioning of the TX and RX feeder cables 103, 107 and TX and RX antennas 105, 109 is critical to the communications system, these are tested at the time of installation, and continue to be monitored during operation. Two methods of monitoring the operation of the TX and RX feeder cables 103, 107 and TX and RX antennas 105, 109 are conventionally used: direct measurement of the voltage standing wave ratio (VSWR) and the use of statistical methods. A testing apparatus 113 is provided in the BS 101 for performing either or both of these tests.

For testing the transmission path, a direct VSWR measurement may be performed by measuring the VSWR of the feeder cable 103 and/or the TX antenna 105 using the power of a signal that has already been transmitted by the BS 101. Using the testing apparatus 113 situated in the BS 101, power leaving the BS 101 is compared with the power reflected into the BS 101 from the TX feeder 103. A low return loss indicates a good TX feeder/TX antenna combination (everything has been radiated); a high return loss indicates that something is wrong (e.g., broken TX feeder 103, missing TX antenna 105, etc.). The measurement function is realized with a directional coupler and power detectors, which are well-known in the art. The power detectors may alternatively be of the narrowband or wideband variety. In time division multiple access (TDMA) systems, the power detectors may work on a per timeslot basis (comparing forward and reverse power in each timeslot). In non-TDMA systems, average power may be detected. The test of the TX antenna 105 may further include checking the condition of the transmitters (not shown) by measuring the forward power.

In order to test the receiving path, a VSWR measurement of the feeder cable 103 and/or the antenna 105 may be made by injecting a test tone signal into the base station side of the RX feeder cable 107 and measuring the reflected signal. Alternatively, receiving path testing may merely involve statistical methods, such as correlating received signal strength with a known distance between the BS 101 and the mobile subscriber 111. (Distance between the BS 101 and the mobile subscriber 111 may be determined at the BS 101 by measuring the duration of time from the transmission of a burst from the BS 101 until a reply is received from the mobile subscriber 111. In time division multiple access (TDMA) systems, the "turnaround" time of the mobile subscriber 111 is adjustable in accordance with a command from the BS 101, in order to enable the slots from different mobile subscribers to arrive at one base station receiver in good TDMA order without overlapping.) A signal strength lower than expected might be indicative of a problem with either or both of the RX antenna 109 and the RX feeder cable 107.

In their simplest form, statistical methods may also be used to check the overall health of the communications system, including the TX and RX antennas 105, 109 and feeder cables 103, 107. That is, if communications traffic is exchanged, then the system is deemed to be functioning properly. If traffic hasn't been exchanged for a certain amount of time, then a problem is detected.

The above-described conventional testing methods present a number of problems. One of these arises from the fact that typical feeder cables have a loss of about 3 dB. Consequently, even if the antenna were to be removed entirely, a VSWR measurement carried out at the BS-end of the feeder cable would not detect a return loss exceeding 6 dB. The measured return loss, then, is as much a function of the actual loss of the feeder cable as it is a function of the antenna VSWR. The measurement accuracy can be improved by measuring/assessing the feeder cable loss and compensating for this loss in the measurement system. However, even if the loss of the feeder cable is known, the accuracy of the measurement will still be very poor. Thus, despite the fact that an accurate measurement of transmitted power can be made at the BS-side of the feeder, the amount of this transmitted power that is actually transmitted through the antenna is uncertain because of the very limited accuracy of the VSWR measurement.

The statistical methods also have problems, despite their simplicity. To begin with, the accuracy of these methods is limited. Furthermore, statistical methods can only be used when communication traffic is exchanged. In the absence of such traffic, it is impossible to tell whether it is simply the case that no one is calling, or whether calls are not being received because the antenna has malfunctioned. This can be a serious problem for base stations that are situated in remote locations. For example, consider a base station, located on an island in an archipelago, that hasn't exchanged a call during the entire month of November. Because of the faraway location, this may simply be the natural result of no one having attempted to place a call. However, it is also possible that a storm in October broke the RX antenna. In this situation it is necessary for the operator to have a way of determining whether a repair person needs to be sent to the island.

SUMMARY

It is therefore an object of the present invention to provide a method and apparatus for making accurate determinations of antenna and feeder cable conditions.

It is a further object of the present invention to control the taking of antenna and feeder cable measurements from a remote location, such as the base station.

In accordance with one aspect of the present invention, the foregoing and other objects are achieved in a communications system that includes a base station coupled to a transmission antenna by means of a transmission feeder cable, and coupled to a receiving antenna by means of a receiving feeder cable. A testing apparatus is situated at or near the antenna ends (i.e., at the top) of the feeder cables. The testing apparatus includes a processor that controls the remaining elements in the testing apparatus. The apparatus also includes communication means for providing two-way communication between the processor and the base station. In a preferred embodiment, the communication means is a digital communications interface, such as a serial input/output (I/O) interface, coupled to one or more feeder cables. Of course, the base station is similarly equipped with communication means that are compatible with that which is provided in the testing apparatus.

In response to commands received from the base station, the processor may initiate one or more tests. For testing the transmission feeder cable, a power detector coupled at or near the antenna end of the cable measures the strength of a signal being supplied to the transmission antenna. Coupling is preferably provided by a directional coupler. Loss caused by the cable may be determined by comparing the power measured at the top of the cable to the known power of the signal supplied to the other end of the cable by the base station.

A power detector/directional coupler combination is also provided so that the reflected power from the transmission antenna may also be measured. In an alternative embodiment, a single power detector is coupled to the two directional couplers, the single power detector being switchable, under control of the processor, between the forward and reverse directions. The forward and reverse power measurements may be used to determine the VSWR of the antenna. These results may be communicated back to the base station, by means of the communication means, so that the base station can compare the measured VSWR with an expected value.

For testing the receiver side, the testing device further includes a test tone generator. The condition of the receiving transmission cable may be tested, in response to a command from the base station, by supplying a test tone of known or determinable strength to the antenna end of the receiving feeder cable. The strength of the signal at the other end of the receiving feeder cable may be measured at the base station. The base station may then determine the amount of attenuation that occurred on the cable, and compare this with an expected value.

The test tone generator is also useful for testing the receiving antenna. In this case, the power of the test tone being supplied to the receiving antenna is either known or measured. A power detector coupled to the antenna end of the receiving feeder cable measures the power of the reflected test tone signal, so that the VSWR can be determined. This information may be communicated to the base station via the communication means. At the base station, the measured VSWR can be compared with an expected VSWR in order to determine the condition of the receiving antenna.

In any of the above embodiments, the processor within the testing apparatus may, alternatively, calculate the measured VSWR, compare this to expected values, and communicate a test result ("OK/Not OK") back to the base station.

BRIEF DESCRIPTION OF THE DRAWINGS

The objects and advantages of the invention will be understood by reading the following detailed description in conjunction with the drawings in which:

FIG. 4 is a flow chart of a sequence for testing a TX feeder cable in accordance with the present invention.

DETAILED DESCRIPTION

It is evident from the above discussion that it would be helpful to make measurements at the antenna-side of the feeder cable, where the antenna VSWR can be measured accurately. One might consider doing this by placing power detection equipment at the antenna-end of the feeder cable, and sending the detected incident and reflected power measurement signals down dedicated lines to the base station. This approach has problems, however, because it would require a complex analog interface that feeds either coupled radio frequency (RF) signals or detected direct current (DC) signals through a pair of long cables down to the BS 101, where the VSWR determination is made. Furthermore, this approach would also require knowing, with a high degree of accuracy, the loss of these two additional cables. The present invention permits the taking of measurements at the antenna-side of the feeder cable, while avoiding the just-described problems.

Figure 1:
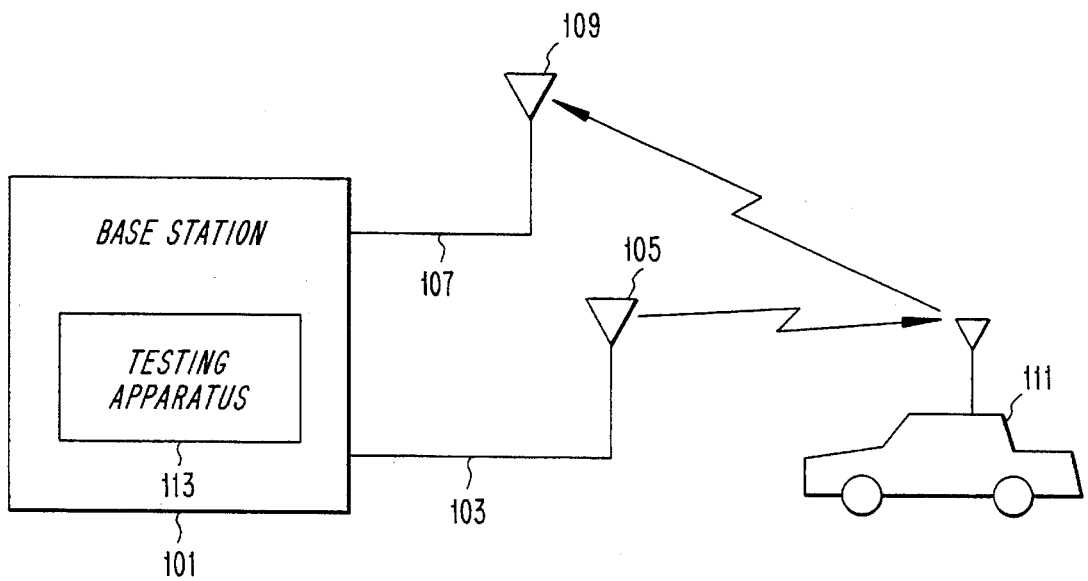
FIG. 1 is a block diagram of a prior art mobile communications system.
Figure 2:
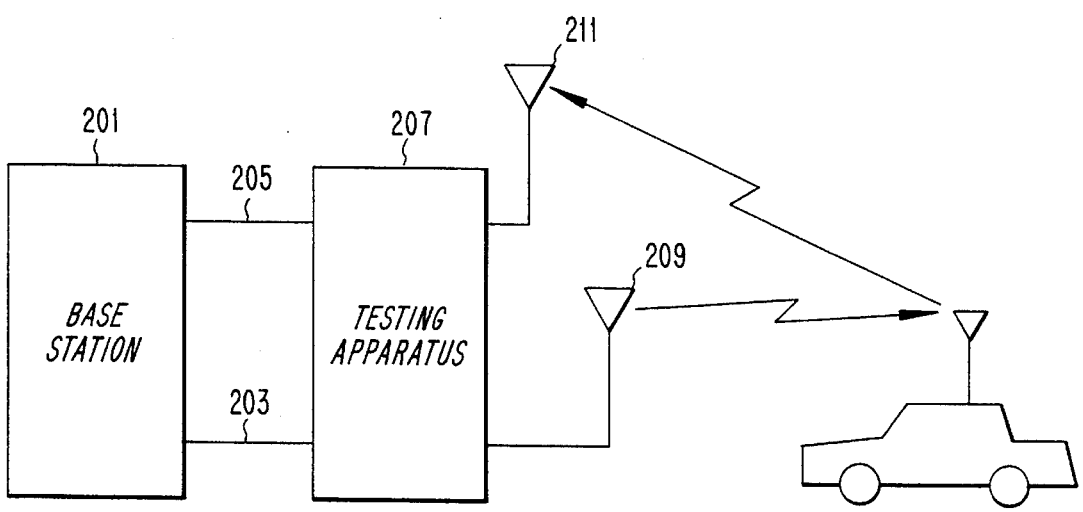
FIG. 2 is a block diagram of a mobile communications system including a testing apparatus in accordance with the present invention.

Referring now to FIG. 2, a block diagram of a mobile communications system in accordance with the present invention is shown. The base station 201 is coupled to a TX feeder cable 203 and to an RX feeder cable 205. Antenna-ends of each of the TX feeder cable 203 and the RX feeder cable 205 are coupled to respective TX and RX antennas 209, 211 to supply and receive signals associated with normal operation of the mobile communications system. A testing apparatus 207 that performs the testing functions described below is coupled substantially at or near the antenna-ends of the TX and RX feeder cables 203, 205. This location at or near the antenna-ends of the TX and RX feeder cables 203, 205 will henceforth be referred to in this specification as the "top" of the respective feeder cables.

In accordance with the present invention, the measurement functions associated with testing and monitoring of the antennas and feeder cables are performed by the testing apparatus 207 at the tops of the TX and RX feeder cables 203, 205 instead of at the BS 201. This overcomes all of the measurement problems associated with the prior art, in which a measurement system is located in the BS 101.

Figure 3:
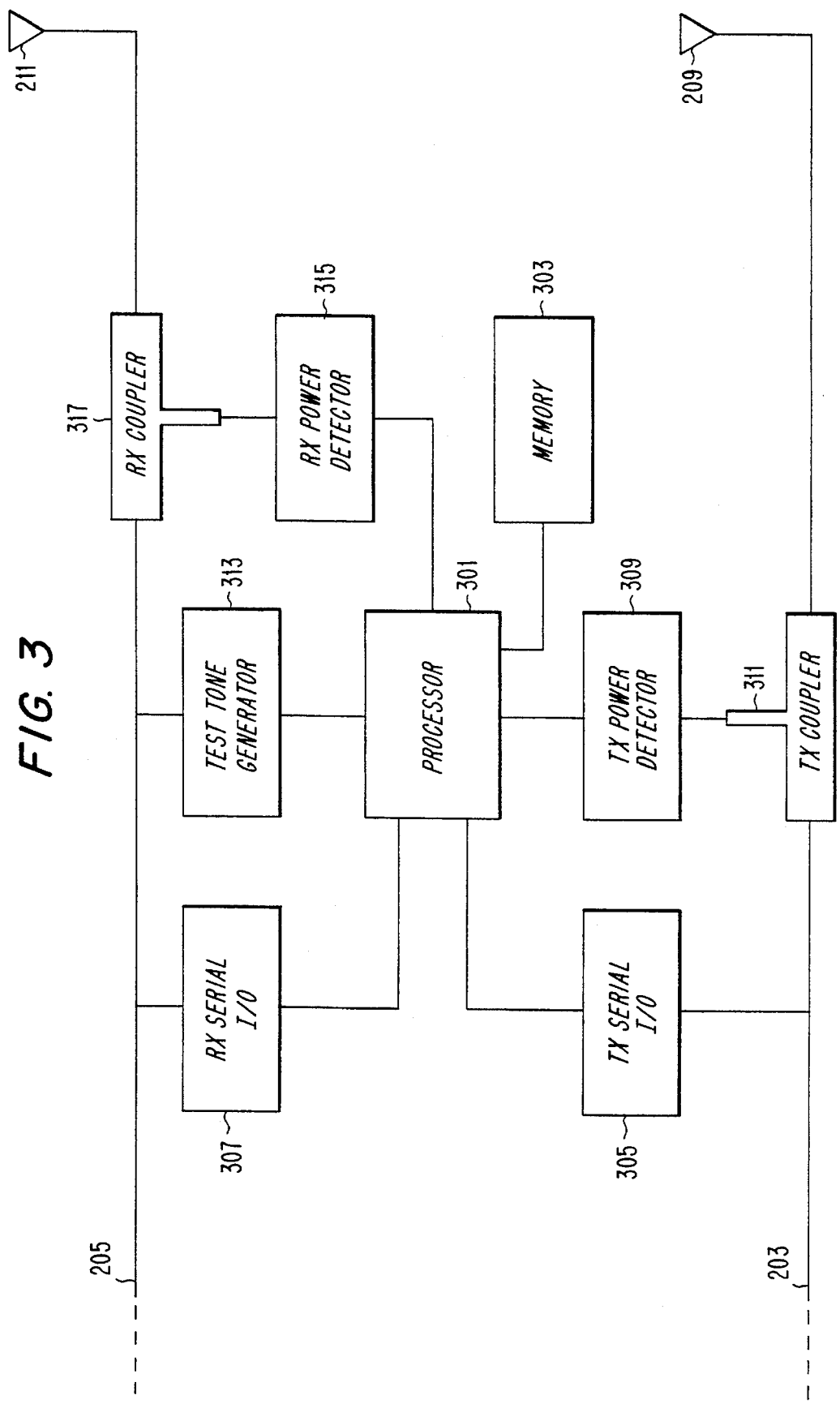
FIG. 3 is a detailed block diagram of the inventive testing apparatus.

A detailed block diagram of the testing apparatus 207 is depicted in FIG. 3. The testing apparatus 207 is preferably a self-contained unit, housed in a rugged weatherproof box (not shown). The heart of the testing apparatus 207 is a processor 301, which may be any of a number of commercially available single chip microprocessors. The microprocessor 301 executes a control program, stored in the memory 303, that causes it to coordinate the operation of the remaining elements that comprise the testing apparatus 207. Because the testing apparatus 207 is typically situated at a location that is not readily accessible to a human operator, the memory 303 is preferably a non-volatile memory, such as a read-only memory (ROM) in which the control program is permanently stored.

The testing apparatus 207 is also equipped with digital communication interfaces for communication with the BS 201. In the preferred embodiment, these are the TX serial input/output (SIO) interface 305 and the RX SIO interface 307. Each of these is coupled to the processor 301 and to a respective one of the TX and RX feeder cables 203, 205. In this way, the antenna feeder cables not only convey the radio frequency signals that make up the normal communication traffic associated with the BS 201, but also provide a communications link between the BS 201 and the processor 301, so that the measurement operations can be initiated from the BS 201, and so that the processor 301 can report back to the BS 201 with measurement results. Each of the TX and RX SIO interfaces 305, 307 may, for example, comprise a universal synchronous-asynchronous receiver-transmitter (USART) coupled to a modulator/demodulator for transmitting the serial data bits on the respective TX and RX feeder cables 203, 205 and for receiving serial data bits therefrom. These devices are well-known in the art, and are not described here further. Also, those having ordinary skill in the art will readily be able to devise, for the communication of measurement operation commands and results, a messaging structure for use with any of a number of known communications protocols.

In accordance with another aspect of the present invention, either or both of the TX and RX feeder cables 203, 205 additionally supplies power to the testing apparatus 207. Bias T's are preferably used at both ends of the feeder cable for coupling the power, which is preferably direct current (DC), to and from the cable. For communications between the testing apparatus 207 and the BS 201, the modulated serial data bits (generated by the TX or RX SIO interfaces 305, 307) are preferably superimposed on the DC supply voltage.

In an alternative embodiment of the invention, the DC power signal that is applied to a feeder cable is also used for conveying the measurement operation commands and results. Here, the polarity of the supply would be switched in correspondence with the set of O's and 1's to be serially communicated. A circuit at the testing apparatus 207 must sense the polarity of the received signal for the purpose of receiving the communication, and simultaneously convert the variable polarity signal into a stable DC signal by means of conventional circuitry. In this embodiment, the testing apparatus 207 may send information back to the BS 201 by modulating its current consumption.

As previously mentioned, the testing apparatus 207 includes components for performing the measurements associated with testing and monitoring of the TX and RX feeder cables 203, 205 and antennas 209, 211. These components will now be described.

The electrical path between the TX feeder cable 203 and the TX antenna 209 includes a directional coupler 311 connected to a TX power detector 309. In order to permit the measurements of incident power reaching the top of the TX feeder cable 203 and of antenna VSWR (thereby determining the actually transmitted power), the TX power detector 309 takes both forward and reverse power measurements. That is, the TX power detector 309 preferably comprises two coupler/detectors, one for each direction. In this embodiment, both forward and reverse measurements are made simultaneously. Alternatively, the TX power detector 309 may comprise a single detector that is switchably connected, under the control of the processor 301, to one of two detectors for making both forward and reverse power measurements.

With either of the above-described embodiments of the TX power detector 309, this unit is further coupled to the processor 301 so that the latter can receive the results of the forward and reverse power measurements. After a measurement has been performed, the processor 301 uses the TX SIO interface 305 to report the measured values back to the BS 201 for further analysis.

A typical sequence for testing the TX feeder cable 203 will now be described with reference to the flow chart depicted in FIG. 4. In response to a command from an operations and maintenance (O&M) center (not shown), the BS 201 places a test signal onto the TX feeder cable 203 (step 401). The test signal may, for example, be a constant modulated carrier signal, a carrier modulated with a pseudo-random modulator, or a carrier modulated with normal traffic data. (In the latter case, this signal would ordinarily be placed onto the TX feeder cable 203 even without the command from the O&M center.)

Next, the BS 201 orders the testing apparatus to perform a TX feeder check operation (step 403). This command is communicated from the BS 201 to the testing apparatus 207 via the TX feeder cable 203 by means of the serial I/O described above.

In response to the received command from the BS 201, the testing apparatus 207 measures both forward and reverse power of the signal appearing at the antenna-end of the TX feeder cable 203 (step 405). Next, in step 407, the processor 301 within the testing apparatus 207 uses the measured values to calculate values for VSWR and Power that appears at the top of the TX feeder cable 203. (Although the Power is actually measured, some calculation may still be necessary, for example, to compensate for known errors in the TX detector 309.)

After performing the calculations, the testing apparatus 207 reports the calculated VSWR and Power values back to the BS 201 (step 409). This communication takes place by means of serial I/O via the TX feeder cable 203.

After receiving the reported VSWR and Power values from the testing apparatus 207, the BS 201 shuts off the test signal (unless, of course, the test signal comprises normal traffic data) (step 411). Then, the BS 201 calculates the feeder loss (in dB) as the reported Power value (from the top of the feeder cable) minus the power level of the test signal (step 413). The power level of the test signal may alternatively be a known value, or it may be measured.

The BS 201 may then alternatively send the reported VSWR and calculated feeder loss values to the O&M center, or it may use these values itself to identify problems with the TX feeder cable 203 (i.e., calculated feeder loss is greater than expected) and with the TX antenna 209 (actually transmitted power is less than expected), and then simply send a simple OK/Not_OK status report back to the O&M center. The BS 201 then resumes normal operation.

The electrical path from the RX antenna 211 to the RX feeder cable 205 similarly includes an RX directional coupler 317. An RX power detector 315, switchable between forward and reverse power measurements and coupled to the RX directional coupler 317, is capable of measuring power flowing in either direction on the RX feeder cable 205. The RX power detector 315 is, in turn, connected to the processor 301 to enable the latter to control the former, and to provide a path for reporting measurement results back to the processor 301.

A test tone generator 313 is also coupled to the top of the RX feeder cable 205. A connection between the test tone generator 313 and the processor 301 provides a means for controlling the test tone generator 313. When the processor 301 determines, for example from an instruction received from the BS 201 by means of the SIO interface 307, that the RX antenna 211 is to be tested, the test tone generator 313 is activated, and a forward power measurement (i.e., a measurement of the amount of power being supplied to the RX antenna 211) is made by the RX power detector 315.

Alternatively, the forward power measurement can be avoided, and a predetermined value used instead, if the test tone generator 313 is very accurate or if the output of the test tone generator 313 can be monitored by the RX power detector 315 and accurately regulated to produce the predetermined value. If the forward power was measured, then this value is supplied to the processor 301 (the processor 301 would already have the predetermined forward power values in the alternative embodiments). The use of an accurate test tone generator 313 is preferred over the other embodiments.

Next, with the test tone generator 313 still activated, the processor 301 causes the RX power detector 315 to measure the amount of power being reflected back from the RX antenna 211 into the RX feeder cable 205. This measurement value is also supplied to the processor 301. Finally, the processor 301 reports the results of both of these measurements back to the BS 201 for further analysis. Alternatively, the processor 301 may, itself, use the measured forward and reflected power values to determine a measured VSWR value which is then reported to the BS 201.

Testing of the RX feeder cable 205 proceeds as follows. The test tone generator 313 is activated, and the power of the test tone being supplied to the RX feeder cable 205 is measured, if necessary, by the RX power detector 315, and the measured value is supplied to the processor 301. Of course, this measurement can be dispensed with if the test tone generator 313 can be relied upon to produce a predetermined power value that can be stored in the BS 201. If the testing apparatus 207 has to measure the power being generated by the test tone generator 313, then the processor 301 uses the RX SIO interface 307 to report its measured value to the BS 201. Meanwhile, a receiver (not shown) at the BS 201 measures the signal strength of the received test tone. Finally, the BS 201 uses the measured (or predetermined) transmitted power value and the measured received power value to determine the RX feeder loss.

The above-described testing methods are preferably performed only at the time of installation of antenna and/or feeder cable installation, or during a self-test of the system. Periodic self-testing of the antenna/feeder cable/BS system should normally be scheduled during low/no traffic hours.

During time periods when the mobile communications system is serving subscribers, the condition of the antennas and feeder cables should be monitored by the above-described statistical methods (i.e., keeping track of the amount of communication traffic). If no (or exceptionally few) calls have been exchanged, then a self-test can be initiated in order to give the operator a very high confidence in the condition of the BS site.

The above-described antenna and feeder test system provides great advantages because, at the TX feeder cable 203, the VSWR of the antenna and actual transmitter power reaching the antenna can be accurately and completely automatically assessed. Similarly at the RX feeder cable 205, the VSWR of the antenna and the actual path loss between the RX antenna 211 and the BS 201 can be accurately determined. These advantages are produced by the placement of the power detectors 309, 315 and test tone generator 313 at the top of the feeder cables as described above. This placement is, in turn, made possible by the provision of a digital communications interface on the feeder cables 203, 205, which provides two capabilities: remote control of the testing apparatus 207, and the communication of measurement results back to the BS 201.

Because of the accuracy of the measurements, the above-described system can be used by an operator to determine, at any time, whether the base station antenna system is performing according to design specifications and whether the intended cell area is actually being covered. This is a great improvement over the conventional monitoring systems, which all allow the cell area coverage to be reduced by a significant amount before an alarm is sounded. In conventional systems, this problem is handled by having overlapping cells, so that a degradation in one cell can be compensated for by a neighboring cell. However, this solution is wasteful of power and frequency spectra. By contrast, the inventive testing system permits much earlier detection of antenna/feeder cable problems, so that mobile communications systems can be designed to operate in a more efficient manner.

It is apparent that the inventive testing system may be used to great advantage by operators who require a high degree of confidence in the performance of their base stations. Additionally, the ability to make measurements close to the antenna makes the above-described testing system particularly well suited for use on high masts, where high feeder losses cause conventional monitoring and testing methods to produce poor results. The ability to control the inventive testing system from a remote location also makes it especially suitable for use at faraway sites, where the cost of extra site visits would otherwise greatly outweigh the cost of the test equipment.

The invention has been described with reference to a particular embodiment. However, it will be readily apparent to those skilled in the art that it is possible to embody the invention in specific forms other than those of the preferred embodiment described above. This may be done without departing from the spirit of the invention. For example, the testing apparatus has been illustrated as having separate RX and TX serial I/O interfaces. However, because each of the I/O interfaces serves essentially the same purpose (i.e., providing a means of communication between the base station and the testing apparatus), such a testing apparatus could also be designed having only a single serial I/O interface coupled alternatively to the RX or the TX feeder cable.

The testing apparatus has also been illustrated as having a single microprocessor for controlling testing of both the RX and TX feeder cables and antennas. However, those skilled in the art will recognize that the testing apparatus could alternatively be split into separate RX and TX units. In this case, each of the units would require its own microprocessor and memory.

Another use of the inventive testing apparatus is a system where a duplexer is installed in the base station, so that a single feeder cable and antenna is used for both transmission and reception. In this case, only those components associated with transmission (i.e., the processor 301, memory 303, TX SIO interface 305, TX power detector 309, and TX coupler 311) are necessary to adequately test the feeder cable and the antenna. However, one might still want to include a test tone generator in the testing apparatus, coupled to the single feeder cable, to be able to test the RX-front end equipment located in the base station.

Of course, any of the above embodiments need not be constructed as stand-alone equipment, but may instead be housed within existing devices, such as an antenna-mounted receiver preamplifier.

Thus, the preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. In a communications system including a base station coupled to a transmission antenna by means of a transmission feeder cable having a top end that is substantially at or near the transmission antenna, a testing apparatus comprising:

first means for measuring incident power of a signal at the top end of the transmission feeder;

a processor, coupled to the first means, for controlling an incident power measurement operation and receiving an incident power measurement value; and communication means, coupled to the processor, for sending information from the processor to the base station, and for receiving information from the base station and supplying the received information to the processor, wherein in response to the received information being a first command, the processor initiates the incident power measurement operation, and wherein the communication means comprises a digital communications interface, coupled to the processor and having an interface for coupling to the top end of the transmission feeder cable, the communications means using the transmission feeder cable as a communications medium.

2. The testing apparatus of claim 1, wherein the digital communications interface is a serial input/output interface device.

3. The testing apparatus of claim 1, wherein the first means comprises:

a directional coupler for detecting power at the top end of the transmission feeder cable; and power measuring means, coupled to the directional coupler, for measuring the detected power.

4. The testing apparatus of claim 1, wherein further the processor uses the communication means to send the incident measurement value to the base station.

5. The testing apparatus of claim 1, further comprising:

second means for measuring, at the top end of the transmission feeder cable, power of a reflected signal from the transmission antenna, and wherein:

the processor is further coupled to the second means, for controlling a reflected power measurement operation and receiving a reflected power measurement value; and in response to the received information being the first command, the processor initiates the reflected power measurement operation.

6. In a communications system including a base station coupled to a receiving antenna by means of a receiving feeder cable having a top end that is substantially at or near the receiving antenna, a testing apparatus comprising:

a test tone generator, having an output for coupling to the top end of the receiving feeder cable;

first means for measuring, at the top end of the receiving feeder cable, power of a reflected test tone signal from the receiving antenna;

a processor, coupled to the test tone generator and to the first means, for controlling a reflected power measurement operation and receiving a reflected power measurement value; and communication means, coupled to the processor, for sending information from the processor to the base station, and for receiving information from the base station and supplying the received information to the processor, wherein in response to the received information being a first command, the processor initiates the reflected power measurement operation, and wherein the communication means comprises a digital communications interface, coupled to the processor and having an interface for coupling to the top end of the receiving feeder cable, the communication means using the receiving feeder cable as a communications medium.

7. The testing apparatus of claim 6, wherein the digital communciations interface is a serial input/output interface device.

8. The testing apparatus of claim 6, wherein the first means comprises:

a directional coupler for detecting power at the top end of the receiving feeder cable; and power measuring means, coupled to the directional coupler, for measuring the detected power.

9. The testing apparatus of claim 6, wherein further the processor uses the communication means to send the reflected power measurement value to the base station.

10. In a communications system including a base station coupled to a transmission antenna by means of a transmission feeder cable having a top end that is substantially at or near the transmission antenna, a method of testing the transmission feeder cable comprising the steps of:

in the base station, supplying to the transmission feeder cable a signal having a known value of power;

in a testing apparatus coupled to the transmission feeder cable, measuring incident power of the signal at the top end of the transmission feeder cable, thereby producing a measured value of incident power being supplied to the transmission antenna;

transmitting the measured value of power to the base station; and in the base station, comparing the measured value of power to the known value of power.

11. The method of claim 10, wherein the steps performed by the testing apparatus are in response to a command received from the base station.

12. The method of claim 11, further comprising the step of transmitting the command from the base station to the testing apparatus via the transmission feeder cable.

13. In a communications system including a base station coupled to a transmission antenna by means of a transmission feeder cable having a top end that is substantially at or near the transmission antenna, a method of testing the transmission antenna comprising the steps of:

in the base station, supplying to the transmission feeder cable a signal having a known value of power;

in a testing apparatus coupled to the transmission feeder cable, measuring incident power of the signal at the top end of the transmission feeder cable, thereby producing a measured value of incident power being supplied to the transmission antenna;

in the testing apparatus, measuring, at the top of the transmission feeder cable, power of a reflected signal from the transmission antenna, thereby producing a measured value of reflected power;

transmitting the measured values of incident and reflected power to the base station; and in the base station, determining a measured voltage standing wave ratio from the measured values of incident and reflected power, and comparing the measured voltage standing wave ratio with a predetermined voltage standing wave ratio.

14. The method of claim 13, wherein the steps performed by the testing apparatus are in response to a command received from the base station.

15. The method of claim 14, further comprising the step of transmitting the command from the base station to the testing apparatus via the transmission feeder cable.

16. In a communications system including a base station coupled to a transmission antenna by means of a transmission feeder cable having a top end that is substantially at or near the transmission antenna, a method of testing the transmission antenna comprising the steps of:

in the base station, supplying to the transmission feeder cable a signal having a known value of power;

in a testing apparatus coupled to the transmission feeder cable, measuring incident power of the signal at the top end of the transmission feeder cable, thereby producing a measured value of incident power being supplied to the transmission antenna;

in the testing apparatus, measuring, at the top of the transmission feeder cable, power of a reflected signal from the transmission antenna, thereby producing a measured value of reflected power;

in the testing apparatus, determining a measured voltage standing wave ratio from the measured values of incident and reflected power;

transmitting the measured voltage standing wave ratio to the base station; and in the base station, comparing the measured voltage standing wave ratio with a predetermined voltage standing wave ratio.

17. The method of claim 16, wherein the steps performed by the testing apparatus are in response to a command received from the base station.

18. The method of claim 17, further comprising the step of transmitting the command from the base station to the testing apparatus via the transmission feeder cable.

19. In a communications system including a base station coupled to a transmission antenna by means of a transmission feeder cable having a top end that is substantially at or near the transmission antenna, a method of testing the transmission antenna comprising the steps of:

in the base station, supplying to the transmission feeder cable a signal having a known value of power;

in a testing apparatus coupled to the transmission feeder cable, measuring incident power of the signal at the top end of the transmission feeder cable, thereby producing a measured value of incident power being supplied to the transmission antenna;

in the testing apparatus, measuring, at the top of the transmission feeder cable, power of a reflected signal from the transmission antenna, thereby producing a measured value of reflected power;

in the testing apparatus, determining a measured voltage standing wave ratio from the measured values of incident and reflected power, and comparing the measured voltage standing wave ratio with a predetermined voltage standing wave ratio to generate a test result alternatively indicative of proper or faulty operation of the transmission antenna; and transmitting the test result to the base station.

20. The method of claim 19, wherein the steps performed by the testing apparatus are in response to a command received from the base station.

21. The method of claim 20, further comprising the step of transmitting the command from the base station to the testing apparatus via the transmission feeder cable.

22. In a communications system including a base station coupled to a receiving antenna by means of a receiving feeder cable having a top end that is substantially at or near the receiving antenna, a method of testing the receiving feeder cable comprising the steps of:

in a testing apparatus, supplying to the top end of the receiving feeder cable a test signal having a known value of power;

in the base station, measuring, at a base station end of the receiving feeder cable, a power value of the test signal; and in the base station, comparing the measured power value with the known value of power.

23. The method of claim 22, further comprising, prior to the comparing step, the step of transmitting the known value of power from the testing apparatus to the base station.

24. The method of claim 22, wherein the steps performed by the testing apparatus are in response to a command received from the base station.

25. The method of claim 24, further comprising the step of transmitting the command from the base station to the testing apparatus via the receiving feeder cable.

26. In a communications system including a base station coupled to a receiving antenna by means of a receiving feeder cable having a top end that is substantially at or near the receiving antenna, a method of testing the receiving antenna comprising the steps of:

in a testing apparatus, supplying to the top end of the receiving feeder cable a test signal having a known value of incident power;

in the testing apparatus, measuring, at the top of the receiving feeder cable, power of a reflected test signal from the receiving antenna, thereby producing a measured value of reflected power;

transmitting the measured value of reflected power to the base station; and in the base station, determining a measured voltage standing wave ratio from the known value of incident power and the measured value of reflected power, and comparing the measured voltage standing wave ratio with a predetermined voltage standing wave ratio.

27. The method of claim 26, wherein the step of transmitting the measured value of reflected power to the base station further comprises transmitting the known value of incident power to the base station.

28. The method of claim 26, wherein the steps performed by the testing apparatus are in response to a command received from the base station.

29. The method of claim 28, further comprising the step of transmitting the command from the base station to the testing apparatus via the receiving feeder cable.

30. In a communications system including a base station coupled to a receiving antenna by means of a receiving feeder cable having a top end that is substantially at or near the receiving antenna, a method of testing the receiving antenna comprising the steps of:

in a testing apparatus, supplying to the top end of the receiving feeder cable a test signal having a known value of incident power;

in the testing apparatus, measuring, at the top of the receiving feeder cable, power of a reflected test signal from the receiving antenna, thereby producing a measured value of reflected power;

in the testing apparatus, determining a measured voltage standing wave ratio from the known value of incident power and the measured value of reflected power;

transmitting the measured voltage standing wave ratio to the base station; and in the base station, comparing the measured voltage standing wave ratio with a predetermined voltage standing wave ratio.

31. The method of claim 30, wherein the steps performed by the testing apparatus are in response to a command received from the base station.

32. The method of claim 31, further comprising the step of transmitting the command from the base station to the testing apparatus via the receiving feeder cable.

33. In a communications system including a base station coupled to a receiving antenna by means of a receiving feeder cable having a top end that is substantially at or near the receiving antenna, a method of testing the receiving antenna comprising the steps of:

in a testing apparatus, supplying to the top end of the receiving feeder cable a test signal having a known value of incident power;

in the testing apparatus, measuring, at the top of the receiving feeder cable, power of a reflected test signal from the receiving antenna, thereby producing a measured value of reflected power;

in the testing apparatus, determining a measured voltage standing wave ratio from the known value of incident power and the measured value of reflected power, and comparing the measured voltage standing wave ratio with a predetermined voltage standing wave ratio to generate a test result alternatively indicative of proper or faulty operation of the receiving antenna; and transmitting the test result to the base station.

34. The method of claim 33, wherein the steps performed by the testing apparatus are in response to a command received from the base station.

35. The method of claim 34, further comprising the step of transmitting the command from the base station to the testing apparatus via the receiving feeder cable.

* * * * *